July 29, 1952     L. E. BARTLING     2,605,140
NOZZLE SUPPORT FOR SPRAY BOOMS
Filed March 1, 1950
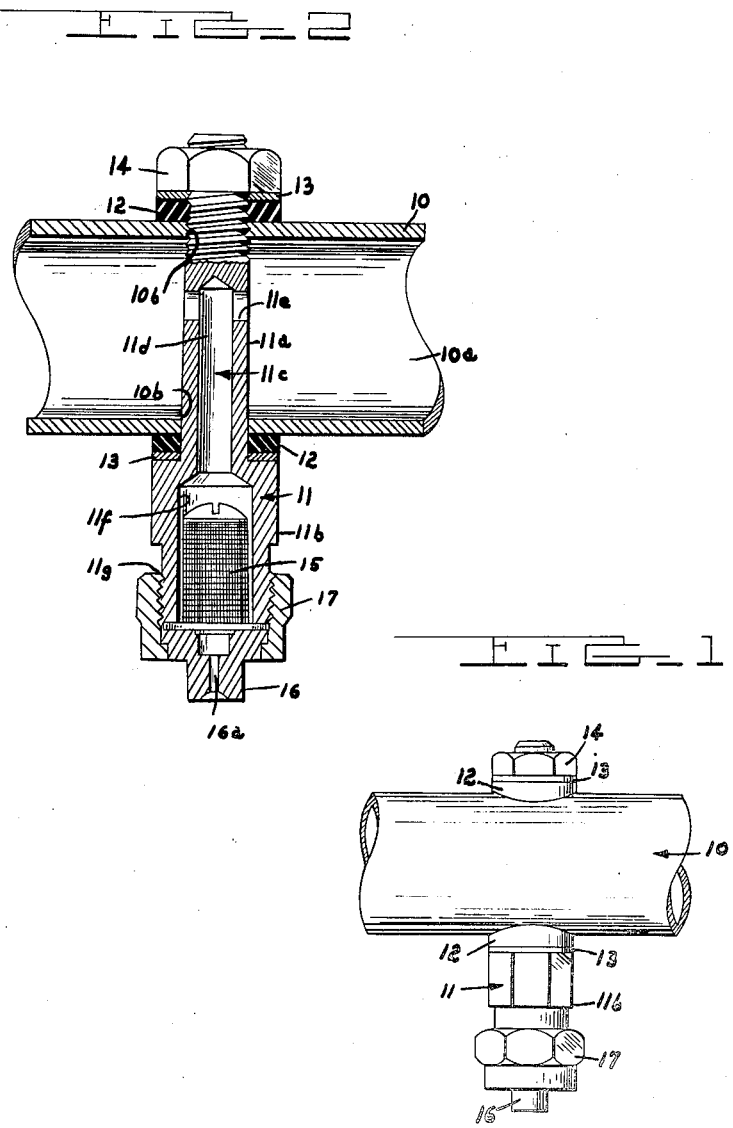
INVENTOR.
LOREN E. BARTLING
BY
ATTORNEY Patented July 29, 1952

2,605,140

UNITED STATES PATENT OFFICE 2,605,140

NOZZLE SUPPORT FOR SPRAY BOOMS

Loren E. Bartling, Detroit, Mich., assignor to Dearborn Motors Corporation, Highland Park, Mich., a corporation of Delaware Application March 1, 1950, Serial No. 147,070

1 Claim. (Cl. 299—106)

This invention relates to an improved agricultural sprayer, and particularly to a simple, economical and effective nozzle support for connecting a spray producing nozzle member to a fluid conducting spray boom.

In most agricultural sprayers, it has been customary to employ a relatively long, hollow boom which functioned not only to support a plurality of nozzles in spaced relationship therealong, but also to conduct the fluid to be sprayed to such nozzles. Obviously, each of the spray producing nozzles must be firmly mounted on the boom in fluid sealed relationship relative thereto, and heretofore there has not been a satisfactory device for accomplishing the removable mounting of the nozzles on the boom and the establishment of the fluid sealed relationship of the nozzles with the fluid conduit defined by the interior of the boom.

Accordingly, it is an object of this invention to provide an improved nozzle support for spray booms, characterized by unusual simplicity and economy of construction.

A particular object of this invention is to provide a nozzle support member of generally bolt-like configuration, having its shank portion traversing a tubular spray boom and clamped thereto in sealed relationship by a fastening device cooperating with the projecting end of such shank portion, and defining a fluid passage extending to the axial end of the nozzle support, which axial end may also accommodate a filtering element and a spray producing nozzle.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a side elevational view of a portion of the spray boom showing a nozzle support embodying this invention assembled thereto.

Figure 2 is a sectional view taken on the plane 2—2 of Figure 1.

As shown on the drawings:

The numeral 10 indicates a portion of a conventional spray boom or conduit formed of metal or similar relatively rigid material and defining a fluid conduit 10a. At one or more locations along the length of the boom 10, a transverse hole 10b is provided in the wall of the boom 10, and such hole is employed to mount a nozzle support 11 constructed in accordance with this invention.

The nozzle support 11 may be conveniently described as being of bolt-like configuration, i. e., it has a cylindrical shank portion 11a fitting snugly in the hole 10b of the boom 10 and the end of such shank portion projects outwardly beyond one side of the boom 10 and is threaded to receive a nut 14. In addition the nozzle support 11 has an enlarged cylindrical head portion 11b. The nozzle support 11 may then be conveniently secured to the boom 10 in fluid sealed relationship through the provision of a rubber sealing washer 12 and a metal washer 13 which fit snugly around the shank portion 11a and are disposed intermediate the head portion 11b and the wall of boom 10, while an additional rubber washer 12 and metallic washer 13 are provided intermediate the nut 14 and the adjacent wall of boom 10. Obviously by tightening the nut 14, the resulting compression of the rubber washers 12 will produce a fluid sealed joint between the nozzle support 11 and the fluid conduit 10a defined by the bore of boom 10.

The nozzle support 11 is provided with a fluid passage 11c which communicates between one axial end of the nozzle support 11 and the interior of the boom 10. For example, the fluid passage 11c may conveniently comprise an axial hole 11d drilled into the nozzle member 11 through the head portion 11b and terminating within the shank portion 11a at a point well within the interior of boom 10. A transverse hole 11e is then drilled through shank portion 11a to provide fluid communication between the axial hole 11d and the bore 10a of the boom 10. Hence, by forming or mounting a spray producing member in the head end of nozzle support 11, it is apparent that the fluid contents of the boom 10 can be conveniently discharged as a spray through the fluid passage provided by the nozzle support 11.

If desired, the outer end of the axial hole 11d may be counterbored as indicated at 11f to provide a chamber in which may be conveniently mounted a suitable filtering element 15, here indicated as a cylindrical plug formed of metallic gauze. A spray producing nozzle 16 is secured across the end of head portion 11b in any convenient manner, such for example, by a collar 17 which is threadably engaged with threads 11g formed on the end of head portion 11b. The nozzle member 16 defines an orifice 16a which is suitably shaped so as to produce a spray discharge of fluid applied thereto.

From the foregoing description, it is apparent that this invention provides an unusually economically manufacturable construction of a nozzle support, which may not only be conveniently mounted on a spray boom in fluid sealed relationship, but may be equally conveniently removed from such spray boom for replacement, cleaning or repair purposes.

It will, of course, be understood that various details of construction may be varied through a wide range without departing from the principles of this invention and it is, therefore, not the purpose to limit the patent granted hereon otherwise than necessitated by the scope of the appended claim.

I claim:

In combination, a fluid conducting tubular spray boom having a pair of oppositely aligned holes therein, a nozzle support comprising a cylindrical head portion having a threaded rod-like shank portion, said shank portion being adapted to project through said aligned holes in said boom, a nut member screwed onto the projecting threaded end of said shank portion, a pair of rubber-like washers respectively mounted on said shank portion underneath said head portion and said nut member, said nut member securing said nozzle support to said boom and compressing said washers in fluid sealing relationship against said boom, said nozzle support having an axial bore extending from said head portion to the interior of said boom, said shank portion having a diametrically disposed hole connecting the interior of said boom with said axial bore, said head portion also having a cylindrical counterbore, a filter element mounted in said counterbore, a cylindrical nozzle abutting the end of said head portion, and an annular cap member for securing said nozzle to said head portion.

LOREN E. BARTLING.

REFERENCES CITED

The following references are of record in the file of this patent:

UNITED STATES PATENTS

| Number | Name | Date |
|---|---|---|
| 2,196,456 | Charroin | Apr. 9, 1940 |
| 2,242,680 | Schacht | May 20, 1941 |
| 2,439,539 | Cellwork | Apr. 13, 1948 |

FOREIGN PATENTS

| Number | Country | Date |
|---|---|---|
| 15,567 | Great Britain | May 13, 1899 |